(12) United States Patent
Hayashi et al.

(10) Patent No.: US 10,598,794 B2
(45) Date of Patent: Mar. 24, 2020

(54) POSITIONING CONTROL METHOD AND POSITIONING DEVICE

(71) Applicant: SEIKO EPSON CORPORATION, Tokyo (JP)

(72) Inventors: Akifumi Hayashi, Matsumoto (JP); Fumikazu Sano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 386 days.

(21) Appl. No.: 15/477,759

(22) Filed: Apr. 3, 2017

(65) Prior Publication Data
US 2017/0299726 A1  Oct. 19, 2017

(30) Foreign Application Priority Data

Apr. 14, 2016  (JP) .................................. 2016-081210

(51) Int. Cl.
| | |
|---|---|
| *G01S 19/19* | (2010.01) |
| *G01S 19/26* | (2010.01) |
| *G01S 19/32* | (2010.01) |
| *G01S 19/42* | (2010.01) |

(52) U.S. Cl.
CPC .............. *G01S 19/19* (2013.01); *G01S 19/26* (2013.01); *G01S 19/32* (2013.01); *G01S 19/42* (2013.01)

(58) Field of Classification Search
CPC ................................ G01S 19/19; G01S 19/26
USPC .................................................... 342/357.25
See application file for complete search history.

(56) References Cited

U.S. PATENT DOCUMENTS

| | | | |
|---|---|---|---|
| 2006/0215740 A1 | 9/2006 | Teruuchi et al. | |
| 2008/0158391 A1 | 7/2008 | Suzuki | |
| 2009/0167603 A1 | 7/2009 | Muraguchi | |
| 2009/0295596 A1 | 12/2009 | Downey et al. | |
| 2011/0292202 A1 | 12/2011 | Tanaka | |
| 2012/0162006 A1* | 6/2012 | Palella | G01S 19/24 342/357.22 |
| 2014/0197946 A1* | 7/2014 | Park | G08B 21/18 340/539.11 |
| 2016/0026156 A1* | 1/2016 | Jackson | G04G 9/007 368/14 |

FOREIGN PATENT DOCUMENTS

| | | |
|---|---|---|
| JP | H09-257903 A | 10/1997 |
| JP | 2005-077318 A | 3/2005 |
| JP | 2006-270510 A | 10/2006 |
| JP | 2008-167307 A | 7/2008 |
| JP | 2009-156734 A | 7/2009 |
| JP | 2014-016234 A | 1/2014 |
| JP | 2014-120856 A | 6/2014 |
| JP | 2014-180036 A | 9/2014 |

* cited by examiner

*Primary Examiner* — Vladimir Magloire
*Assistant Examiner* — Helena H Seraydaryan
(74) *Attorney, Agent, or Firm* — Oliff PLC

(57) ABSTRACT

A positioning control method of a positioning device worn on a user's body includes switching a positioning mode to a swimming mode and executing a positioning operation for the swimming mode when the positioning mode is switched to the swimming mode.

12 Claims, 10 Drawing Sheets

POSITIONING CONTROL METHOD AND POSITIONING DEVICE

BACKGROUND

1. Technical Field

The present invention relates to a positioning device, which is worn on a human body, or the like.

2. Related Art

A wrist watch type positioning device, which is called a sports watch and mounted with a global positioning system (GPS) receiver, targeting a sports lover is widely distributed. The sports watch is used in order to record a movement locus or speed in sports causing movement outdoors, such as marathon, walking, cycling, climbing, tracking, or the like. However, the positioning device mounted with the GPS receiver is rarely used in swimming which is one of the sports causing movement outdoors. It is considered that there is a problem that it becomes difficult to receive a signal from a satellite during swimming and it is unable to accurately measure a position because a signal strength of electric wave, especially, electric wave having a high frequency which is a satellite positioning signal is remarkably attenuated under the water. This is similar to a case where another satellite positioning system is used without being limited to the GPS.

Although a technical field is different from the sports watch, a technology in which the GPS turned off under the water in a photography device mounted with a GPS receiver for detecting positional information associated with a photographed image in order to be used under the water and on land is disclosed in, for example, JP-A-2014-180036.

However, the sports watch is used by being worn on a user's wrist and may be moved back and forth between under the water and in the air during swimming. Furthermore, in order to record a locus of swim performed by a swimmer, a continuous position calculation is needed even though the sports watch is present under the water. Accordingly, as in JP-A-2014-180036 described above, it is unable to apply the technology of the photography device, which photographs by turning the GPS off, to the sports watch as it is to actions after it is determined that the sports watch is present under the water. In the first place, the photography device is a device in which a switch is turned ON only when photographing is performed and turned OFF when photographing is completed.

SUMMARY

An advantage of some aspects of the invention is to provide a technology for performing a positioning operation suitable for swimming in a positioning device worn on a user's body to be used.

A first aspect of the invention is directed to a user's body, the method including: switching of a positioning mode to a swimming mode; and executing a positioning operation for the swimming mode when the positioning mode is switched to the swimming mode.

As another aspect of the invention, the first aspect of the invention may be configured as a positioning device worn on a user's body and including a mode switching unit that switches a positioning mode to a swimming mode and a positioning operation unit that executes a positioning operation for the swimming mode when switching to the swimming mode.

According to the first aspect and the like of the invention, in the positioning device worn on the body, the positioning mode is able to be switched to the swimming mode and thus, it is possible to execute the positioning operation suitable for the swimming mode.

As a second aspect of the invention, the positioning control method according to the first aspect of the invention may be configured such that the positioning device includes a reception unit that receives positioning satellite signals from positioning satellites, and the executing of positioning operation includes suppressing of use of received frequency included in a received result by the reception unit and calculating a position using the pseudo range included in the received result.

According to the second aspect of the invention, it is possible to suppress use of the received frequency by the reception unit that receives positioning satellite signals from positioning satellites and calculate a position using the pseudo range in swimming, there is a problem that large variation may occur in a received frequency due to signal attenuation caused by swinging of the arms performed by a user and the movement of the arms between under the water (below water surface and in the air (above water surface). However, as in the second aspect of the invention, it is possible to calculate the position using the pseudo range to improve positioning accuracy, without using a received frequency having a large error.

As a third aspect of the invention, the positioning control method according to the second aspect of the invention may be configured such that the calculating of the position includes calculating the position by a least square method using the pseudo range.

According to the third aspect of the invention, it is possible to calculate the position by the least square method using the pseudo range.

As a fourth aspect of the invention, the positioning control method according to the second aspect of the invention may be configured such that the calculating of the position is calculating the position by Kalman filter processing using the pseudo range.

According to the fourth aspect of the invention, is possible to calculate the position by the Kalman filter processing using the pseudo range.

As a fifth aspect of the invention, the positioning control method according to the fourth aspect of the invention may be configured such that the calculating of the position is predicting a position using a given movement distance peg unit time instead of a speed obtained from the received frequency or predicting a position by regarding that the position is not moved, in predicting of the Kalman filter processing.

According to the fifth aspect of the invention, it is possible to predict a position using a given movement distance per unit time instead of a speed obtained from the received frequency or predict a position by regarding that the position is not moved, in predicting of the Kalman filter processing.

As a sixth aspect of the invention, the positioning control method according to the first aspect of the invention may be configured such that the positioning device includes a reception unit that receives positioning satellite signals from positioning satellites, the method further includes determining whether the positioning device is present under the water or not, and the executing of the positioning operation includes calculating a position using received signals of the reception unit when it is determined that the positioning device is not present under the water.

According to the sixth aspect of the invention, it is possible to calculate the position using the received signal of the positioning satellite signals from the positioning satellites when the positioning device is not present under the water. That is, the received signals when the positioning device is present under the water are not used for calculating the position and thus, it is possible to improve positioning accuracy.

As a seventh aspect of the invention, the positioning control method according to the sixth aspect of the invention may be configured such that the method further includes stopping an operation of the reception unit when it is determined that the positioning device is present under the water.

According to the seventh aspect of the invention, it is possible to stop the operation of the reception unit when the positioning device is present under the water and calculate the position using the received signal. That is, the reception unit is allowed to be operated only when the positioning device is not present under the water and the position is calculated using the received signals when the positioning device is present under the water and thus, it is possible to improve positioning accuracy and reduce power consumption.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Device Configuration

Figure 1:
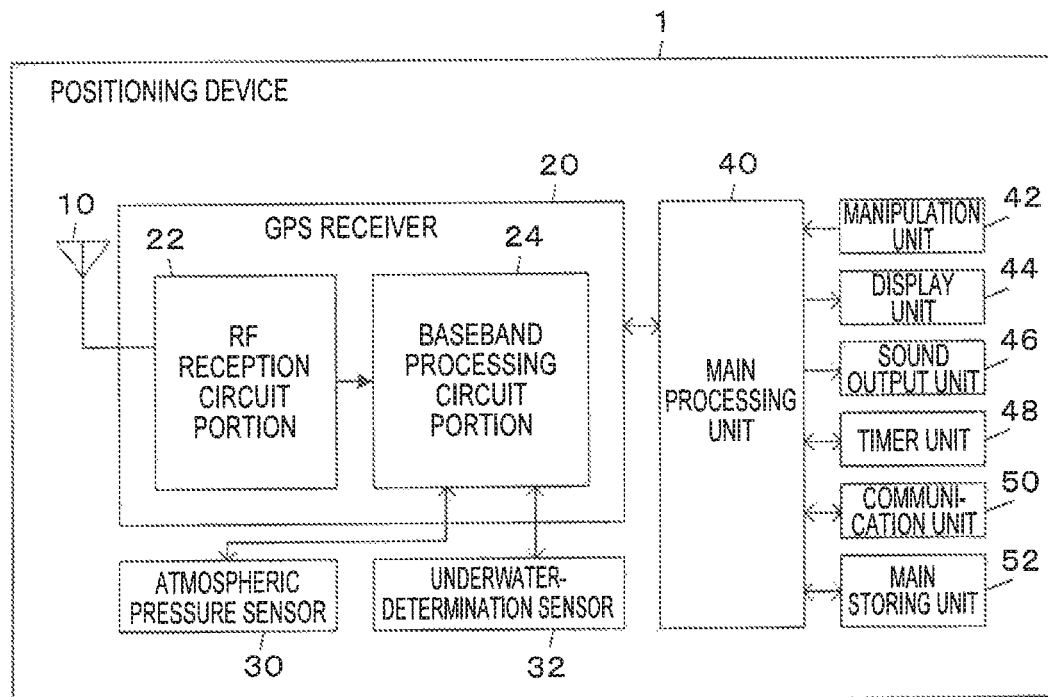
FIG. 1 is a configuration diagram of a positioning device.

FIG. 1 is a diagram illustrating an overall configuration of a positioning device 1 in the present embodiment. According to FIG. 1, the positioning device 1 is configured to include a reception antenna 10, a GPS receiver 20, an atmospheric pressure sensor 30, an underwater-determination sensor 32, a main processing unit 40, an operation unit 42, a display unit 44, a sound output unit 46, a timer unit 48, a communication unit 50, and a main storing unit 52.

The reception antenna 10 is an antenna that receives a radio frequency (RF) signal including a GPS satellite signal transmitted from a GPS satellite.

The GPS receiver 20 calculates a timepiece error or a position of the GPS receiver 20 based on a navigation message such as orbit information (ephemeris or almanac) of GPS satellites or the like carried by being superposed in the GPS satellite signals received by the GPS antenna 12. The GPS receiver 20 is configured to include an RF reception circuit portion 22 and a baseband processing circuit portion 24. The RF reception circuit portion 22 and the baseband processing circuit portion 24 are able to be manufactured as separate large scale integration (LSI) devices, respectively, and is also able to be manufactured as a single chip.

The RF reception circuit portion 22 is a reception unit receiving GPS satellite signals which are positioning satellite signals from GPS satellites which are positioning satellites, and down-converts the RF signal received by the reception antenna 10 into an intermediate frequency signal, amplifies the intermediate frequency signal, and converts the intermediate frequency signal into a digital signal to be output. When a direct conversion type circuit is used, the RF signal can be converted into a digital signal to be output after directly converting the RF signal into a baseband frequency signal.

The baseband processing circuit portion 24 captures the GPS satellite signal using data of the received signal output from the RF reception circuit portion 22 and calculates a position of the GPS receiver 20 (or position of positioning device 1) and an error of a timepiece which is measured by the timer unit 48 or an internal clock of the GPS receiver 20 using satellite orbit information or time information extracted from the captured GPS satellite signal.

The atmospheric pressure sensor 30 is a sensor measuring atmospheric pressure around the positioning device 1. The underwater-determination sensor 32 is a sensor detecting whether the positioning device 1 is present under the water or not.

The main processing unit 40 is an operation processing device configured by a processor such as a central processing unit (CPU), a field programmable gate array (FPGA) or an application specific integrated circuit (ASIC) and integrally controls respective units of the positioning device 1 according to various programs such as a system program stored in the main storing unit 52. The main processing unit 40 executes various processing based on a positioning result of the GPS receiver 20.

The operation unit 42 is an input device configured by a touch panel or a button switch and outputs a manipulation signal according to manipulation of a user to the main processing unit 40. The display unit 44 is a display device configured by a liquid crystal display (LCD) or the like and performs various displaying based on a display signal from the main processing unit 40. The sound output unit 46 is a voice output device configured by a speaker or the like and outputs various voices based on a sound signal from the main processing unit 40. The timer unit 48 is an internal clock, and is configured by an oscillation circuit having a crystal oscillator, and measures the current time or the time elapsed from designated timing. The communication unit 50 is a wireless communication device compatible with, for example, a wireless local area network (LAN) or Bluetooth® and performs communication with an external device.

The main storing unit 52 is a storage device configured by a read only memory (ROM), a random access memory (RAM), or the like. Data or a program used for realizing various functions of the positioning device 1 by the main processing unit 40 is stored in the main storing unit 52, the main storing unit 52 is used as a work area of the main processing unit 40, and an operation result of the main processing unit or manipulation data from the operation unit 42 are temporarily stored in the main storing unit 52.

Outline

The positioning device 1 of the present embodiment is so-called a sports watch which is mounted h the GPS receiver 20, forms a wrist watch, and is used by being worn on an arm and a wrist which is a human body of a user. As characteristics of the present embodiment, the positioning device 1 has a swimming mode adapted to swimming as a positioning mode.

Positioning during swimming has a disadvantage that positioning accuracy is deteriorated due to a remarkable reduction of a signal strength of a GPS satellite signal under the water unlike other sports. That is, when a case where a user swims in a general style of swimming such as crawl, butterfly, or backstroke is considered, for each stroke (one movement of the arm), the positioning device 1 worn on the wrist or the arm of the user is moved back and forth between under the water (below water surface) and in the air (above water surface). That is, in the positioning device 1, normally, a GPS satellite signal (in the air) and a GPS satellite signal of which a signal strength is remarkably reduced are alternately received in a comparatively short period of time and thus positioning accuracy is deteriorated.

In swimming, a relative velocity vector of the GPS receiver 20 and the GPS satellite is periodically varied and a doppler frequency is periodically varied due to an arm swing action in which the arms are moved back and forth periodically and as a result, errors are superposed onto the received frequency. Among the arm swing actions, mainly, the arm swing action is performed in the air (above water surface) when the arms are moved forwardly and the arm swing action is performed under the water (below water surface) when the arms are moved backwardly. For that reason, the positioning device 1 worn on the wrist or the arm of the user measures a speed faster than an actual speed of the user.

The swimming mode is a mode for coping with the problem that the GPS satellite signal is remarkably attenuated under the water. In the following, four examples regarding the swimming mode will be described. In the following examples, description will be made by using two positioning modes of a swimming mode which is characteristics of the present embodiment and a land mode which is not influenced by the attenuation of GPS satellite signal under the water as the positioning modes of the positioning device 1.

First Example

Outline

In the swimming mode of the first example, a positioning operation is performed by suppressing use of a received frequency (doppler frequency) and using a pseudo range (code phase) among pieces of measurement information obtained as a reception result of a GPS satellite signal. Specifically, a position calculation is performed by using a least square method which solves simultaneous equations, in which a position of GPS receiver 20 (or, a position of positioning device 1) or a timepiece error is used as a variable and which is based on pseudo ranges regarding a plurality of GPS satellites, in an approximately estimating manner by an iterative operation.

Baseband Processing Circuit Portion

Figure 2:
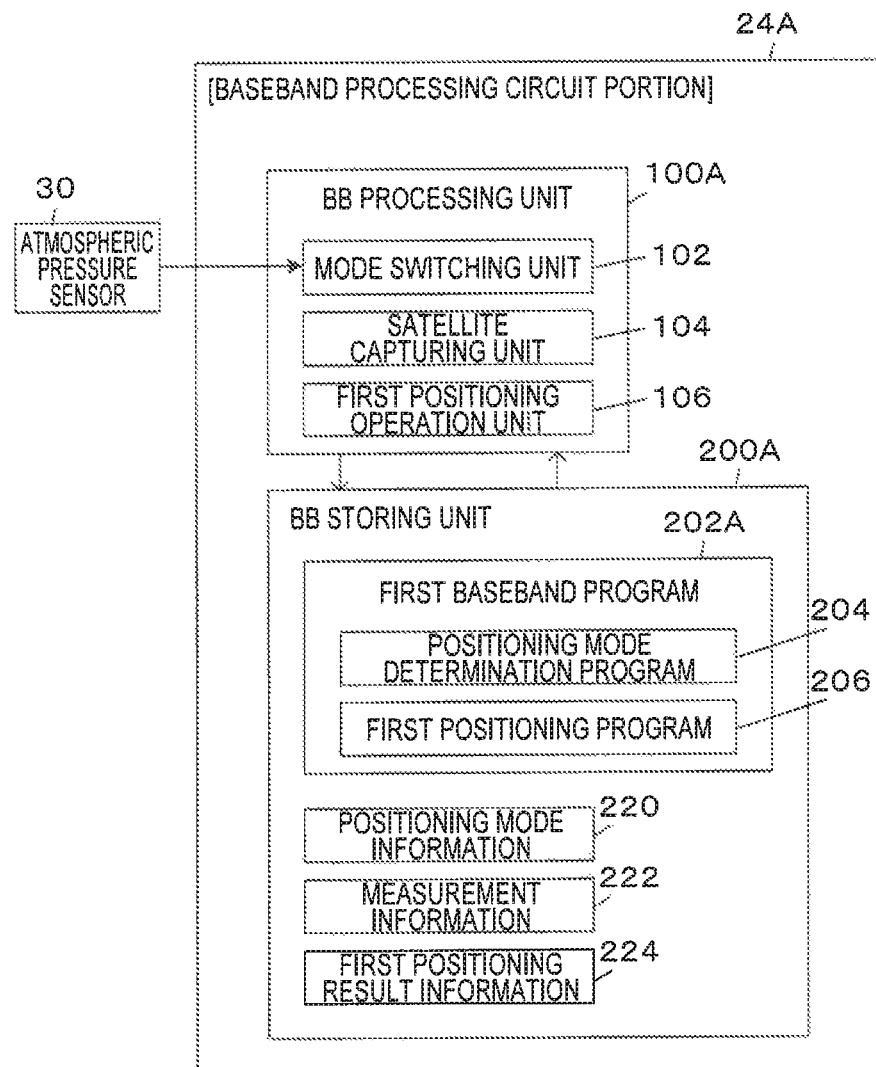
FIG. 2 is a circuit configuration diagram of a baseband processing circuit portion in a first example.

FIG. 2 is a configuration diagram of a baseband processing circuit portion 24A in the first example. According to FIG. 2, the baseband processing circuit portion 24A includes a baseband (BB) processing unit 100A and a BB storing unit 200A.

The BB processing unit 100A is realized by a processor such as a CPU or a digital signal processor (DSP) and integrally controls respective units of the GPS receiver 20. The BB processing unit 100A includes a mode switching unit 102, a satellite capturing unit 104, and a first positioning operation unit 106 as functional units realized by execution of the first baseband program 202A.

The mode switching unit 102 switches the positioning mode to the swimming mode or the land mode based on a measurement value of the atmospheric pressure sensor 30. Environmental atmospheric pressure (atmospheric pressure in a case of being in the air and water pressure in a case of being under the water) under the water is higher than that in the air. In the following, description will be made by referring suitably environmental atmospheric pressure to as "atmospheric pressure". During swimming, the arms are moved back and forth periodically between under the water and in the air and twos, the measurement value of the atmospheric pressure sensor 30 of the positioning device 1 worn on the wrist of the user who is swimming is periodically changed. For that reason, when it is determined whether change in atmospheric pressure exceeds a predetermined threshold value (for example, 10 hPa) in a predetermined period of time (for example, 4 seconds) and it is determined that the change in atmospheric pressure continuously exceeds the predetermined threshold value in a predetermined number of times (for example, 2 tires) or more, the positioning mode is assumed as the swimming mode. When there is no change in atmospheric pressure by greater than or equal to a predetermined threshold value for a predetermined period of time (for example, 5 minutes or 10 minutes) or more, the positioning mode is assumed as the land mode. The positioning mode which is currently set is stored as positioning mode information 220.

The satellite capturing unit 104 captures a GPS satellite by performing signal processing such as a carrier removal or a correlation operation on the received signal and acquires measurement information 222 or satellite orbit information of each captured GPS satellite. The measurement information 222 includes a code phase or a received frequency of the captured satellite.

The first positioning operation unit 106 calculates the timepiece error or the position of the GPS receiver 20 by performing position calculation processing using the measurement information 222 or the satellite orbit information acquired from the satellite signal captured by the satellite capturing unit 104. Specifically, when the positioning mode is the swimming mode, the position calculation (least square (LS)) positioning) is performed by suppressing use of the received frequency (doppler frequency) and using a least square method which uses the pseudo range (code phase) based on the reception result, among acquired measurement information 222. On the other hand, when the positioning mode is the land mode, a position calculation (Kalman filter (KF) positioning) using, for example, a Kalman filter is performed as a positioning operation in which both the pseudo range (code phase) and the doppler frequency (received frequency) of the measurement information 222 are used. A result of the position calculation is stored as first positioning result information 224.

The BB storing unit 200A is realized by a storage device such as a ROM or a RAM, stores data or a system program used for integrally controlling the baseband processing circuit portion 24A by the BE processing unit 100A, is used as a work area of the BE processing unit 100A, and temporarily stores an operation result of the BB processing unit 100A. In the present embodiment, a first baseband program 202A, positioning mode information 220, measurement information 222, and first positioning result information 224 are stored in the BB storing unit 200A. The first baseband program 202A includes a positioning mode determination program 204 for realizing positioning mode determination processing (see FIG. 3) which will be described later and a first positioning program 206 for realizing positioning processing (see FIG. 4) which will be described later.

Flow of Processing (A) Positioning Mode Determination Processing

Figure 3:
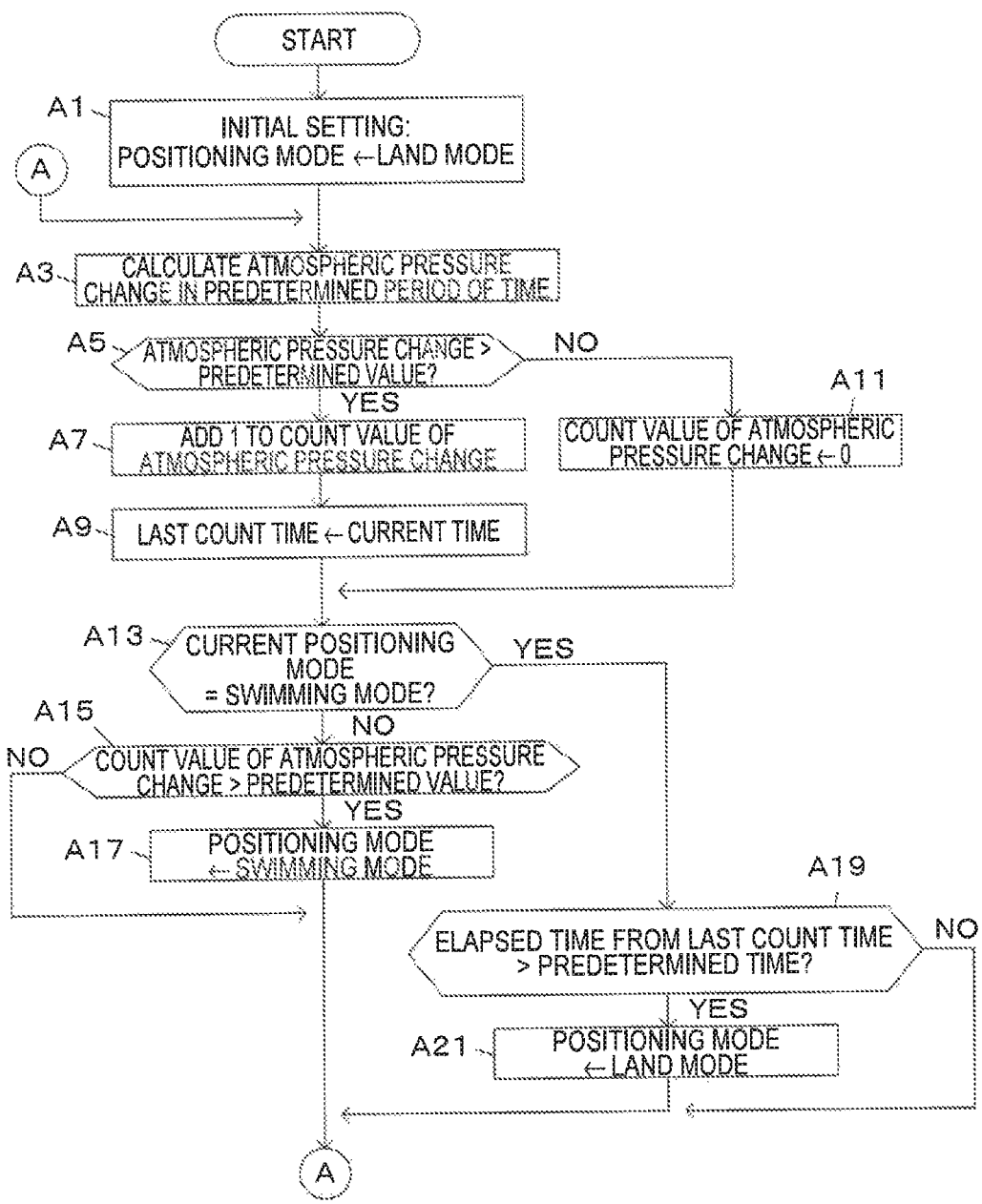
FIG. 3 is a flowchart of positioning mode determination processing.

FIG. 3 is a flowchart for explaining positioning mode determination processing. In the positioning mode determination processing, the mode switching unit 102 sets, first, as initial setting, the positioning mode as the land mode (Step A1). Next, change in an atmospheric pressure in a predetermined period of time (for example, for 4 seconds) is calculated based on the measurement value of the atmospheric pressure sensor 30 (Step A3). When the calculated change in an atmospheric pressure exceeds a predetermined threshold value (for example, 10 hPa) (YES in Step A5), a count value of atmospheric pressure change is updated with a value obtained by adding "1" to the count value (Step A7). The last count time is updated with the current time (Step A9). On the other hand, the change in the atmospheric pressure is less than or equal to a predetermined threshold value (NO in Step A5), the count value of atmospheric pressure change is updated to "0" (Step A11).

Next, the current positioning mode is set as the land mode (NO in Step A13), the count value of atmospheric pressure change is compared with a predetermined threshold value (for example, 2). When the count value of atmospheric pressure change exceeds the predetermined threshold value (YES in Step A15), the positioning mode is changed to the swimming mode (Step A17). When the count value of atmospheric pressure change does not exceed the predetermined threshold value (NO in Step A15), the positioning mode is not changed. On the other hand, when the current positioning mode is set as the swimming mode (YES in Step A13), an elapsed time from the last count time is calculated and the elapsed time is compared with predetermined threshold time (for example, 10 minutes). When the elapsed time exceeds the predetermined threshold time (YES in Step A19), the positioning mode is changed to the land mode (Step A21). When the elapsed time does not exceed the predetermined threshold time (NO in Step A19), the positioning mode is not changed. Thereafter, the processing returns to Step A3 and similar processing is repeated.

(B) Positioning Processing

Figure 4:
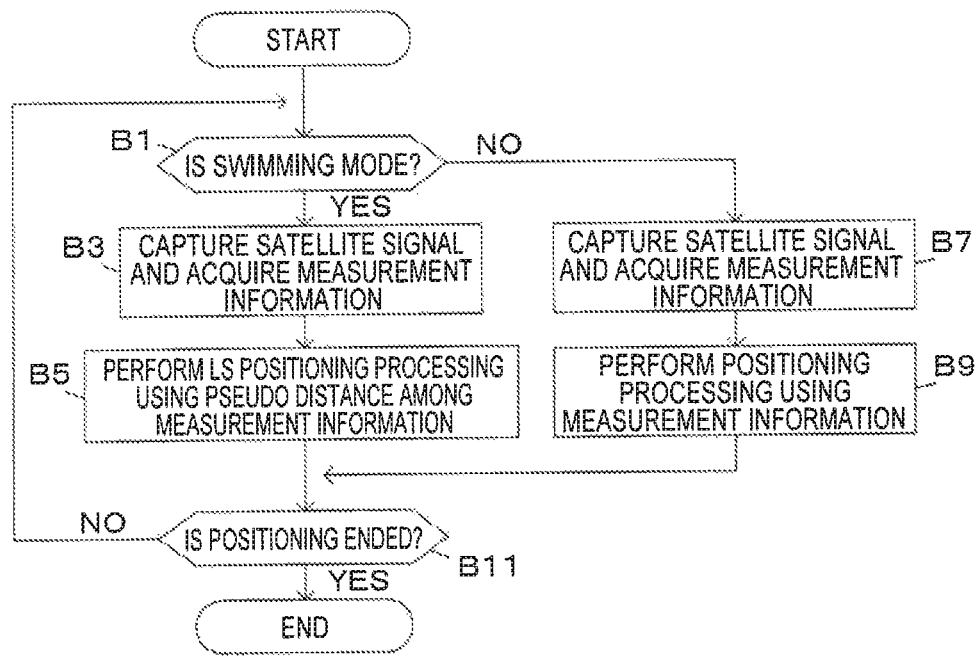
FIG. 4 is a flowchart of positioning processing in the first example.

FIG. 4 is a flowchart of positioning processing in the first example. In the positioning processing, first, the current positioning mode is determined. When the current positioning mode is the swimming mode (YES in Step B1), the satellite capturing unit 104 captures a GPS satellite signal by performing correlation operation processing on the received signal and acquires the measurement information 222 (Step B3). Next, the first positioning operation unit 106 performs a position calculation (LS positioning) using the least square method based on the pseudo ranges regarding a plurality of GPS satellites, among acquired measurement information 222, as a positioning operation in which the pseudo range (code phase) is used and the doppler frequency (received frequency) is not used (Step B5).

On the other hand, when the current positioning mode is the land mode (NO in Step B1), the satellite capturing unit 104 captures the GPS satellite signal by performing the correlation operation processing on the received signal and acquires measurement information (Step B7). Next, the first positioning operation unit 106 performs a position calculation (KF positioning) using, for example, the Kalman filter as a positioning operation using both the doppler frequency (received frequency) and the pseudo range (code phase) of the acquired measurement information 222 (Step B9).

Thereafter, it is determined whether the positioning is ended and when it is determined that positioning is not ended (NO in Step B11) the processing returns to Step B1 When it is determined that the positioning is ended (YES in Step B11), the positioning processing is ended.

Effect

As described above, in the swimming mode of the first example, the position calculation sing the least square method based on the pseudo ranges regarding a plurality of GPS satellites is performed as the positioning operation in which the pseudo range (code phase) is used and the doppler frequency (received frequency) is not used, among measurement information obtained as a reception result of the GPS satellite signal.

In swimming, a large error may occur in the received frequency (doppler frequency) measured by the positioning device 1 worn on the wrist of the user due to the forward and backward arm wing action of the user. In swimming, although the arm of the user is moved back and forth between below-water-surface (underwater) and above-water-surface (in the air), the GPS satellite signal is remarkably attenuated under the water. For that reason, the positioning operation is performed using only the pseudo range among the received frequency (doppler frequency) and the pseudo range so as to make it possible to improve positioning accuracy.

Second Example

Next, a second example will be described. In the second example, the same constitutional elements as those of the first example are denoted by the same reference numerals and detailed description thereof will be omitted.

Outline

In the swimming mode of the second example, a positioning operation in which the pseudo range (code phase) is used and the received frequency (doppler frequency) is not used, among measurer e t information obtained as a reception result of the GPS satellite signal, is performed. Specifically, although the position calculation using the Kalman filter is performed, the position calculation is executed using a speed obtained from a temporal change of a position, which is a result of the positioning operation performed in the most recent past, instead of a speed obtained from the doppler frequency, in a prediction step of the Kalman filter. That is, Kalman filter processing using the pseudo range is executed using a given movement distance per unit time, instead of the speed obtained from the received frequency, the prediction step.

Configuration

Figure 5:
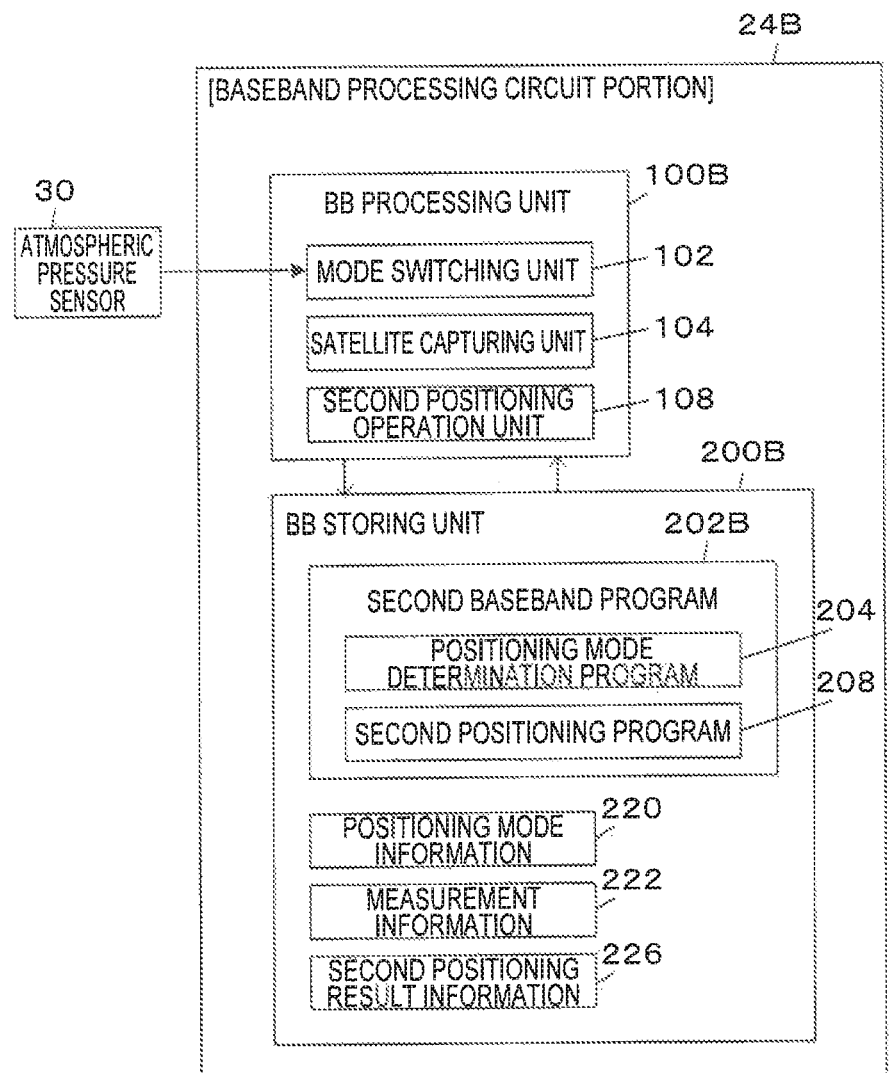
FIG. 5 is a circuit configuration diagram of a baseband processing circuit portion in a second example.

FIG. 5 is a configuration diagram of a baseband processing circuit portion 24B in the second example. According to FIG. 5, in the baseband processing circuit portion 24B, a BB processing unit 100E includes the mode switching unit 102, the satellite capturing unit 104, and a second positioning operation unit 108.

The second positioning operation unit 108 calculates the timepiece error or the position of the GPS receiver 20 by performing position calculation processing using the measurement information 222 or satellite orbit information acquired from a satellite signal captured by the satellite capturing unit 104.

Specifically, when the positioning mode is the swimming mode, a position calculation using the Kalman filter is performed as the positioning operation in which the pseudo range (code phase) is used and the doppler frequency (received frequency) is not used, among acquired measurement information 222. As an example of the position calculation of the related art using the Kalman filter, a case where (a) a prediction step of predicting a position from a speed obtained from a received frequency and (b) a step of correcting the position predicted in the prediction step using a pseudo range (code phase) which is an observation quantity and determining the position are performed is considered. Regarding the correction of the position described above, in the present example, (a) in the prediction step, the position is corrected using the speed which is a given movement distance per unit time and is obtained as the temporal change of the position obtained by the most recent positioning, without using the speed obtained from the received frequency.

On the other hand, when the positioning mode is the land mode, the position calculation using, for example, the Kalman filter of the related art described above, is performed as the positioning operation using both the doppler frequency (received frequency) and the pseudo range (code phase) of the measurement information 222. The result of the position calculation is stored as second positioning result information 226.

In the BB storing unit 200B, a second baseband program 202B, the positioning mode information 220, the measurement information 222, and a second positioning result information 226 are stored. The second baseband program 202B includes the positioning mode determination program 204 for realizing the positioning mode determination processing (see FIG. 3) described above and a second positioning program 208 for realizing positioning processing (see FIG. 6) which will be described later.

Flow of Processing

Figure 6:
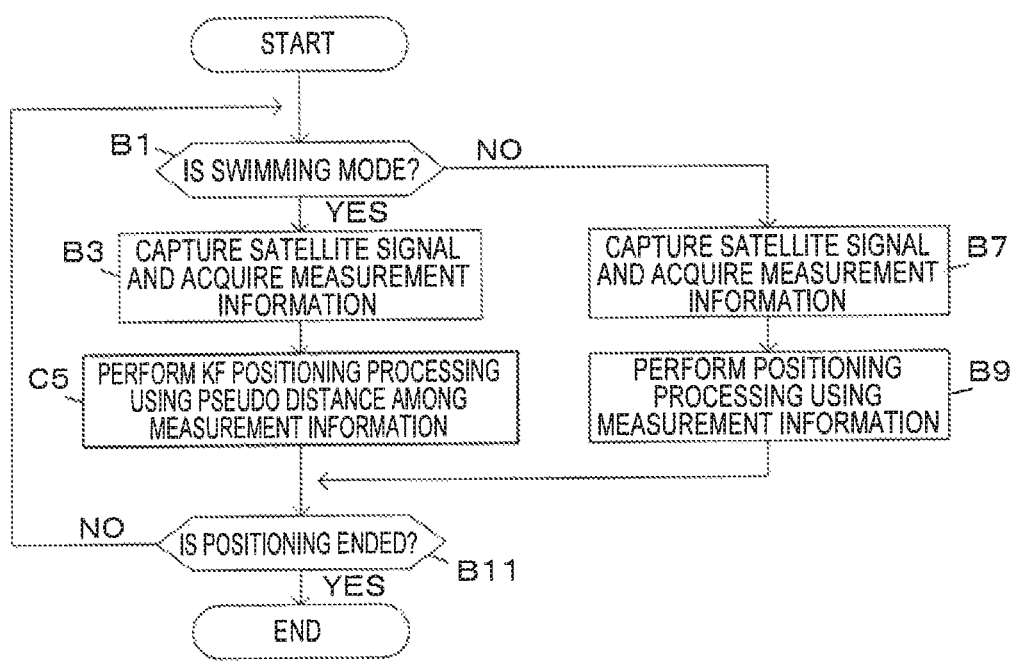
FIG. 6 is a flowchart of positioning processing in the second example.

FIG. 6 is a flowchart for explaining a flow of positioning processing realized by executing the second positioning program 208. In the positioning processing, first, the current positioning mode is determined. When the current positioning mode is the swimming mode (YES in Step B1), the satellite capturing unit 104 captures a GPS satellite signal by performing correlation operation processing on the received signal and acquires the measurement information 222 (Step B3). Next, the second positioning operation unit 108 performs a position calculation using a speed obtained as a temporal change of the position obtained from the most recent positioning, instead of the speed obtained from the received frequency, among acquired measurement information 222, as a positioning operation in which the pseudo range (code phase) is used and the doppler frequency (received frequency) is not used, in the prediction step in the position calculation using the Kalman filter (Step C5).

On the other hand, when the current positioning mode is the land mode (NO in Step B1), the satellite capturing unit 104 captures the GPS satellite signal by performing correlation operation processing on the received signal and acquires measurement information (Step B7). Next, the second positioning operation unit 108 performs a conventional position calculation (KF positioning) using, for example, the Kalman filter as a positioning operation using both the doppler frequency (received frequency) and the pseudo range (code phase) of the acquired measurement information 222 (Step B9).

Thereafter, it is determined whether the positioning is ended and when it is determined that positioning is not ended (NO in Step B11), the processing returns to Step B1. When it is determined that the positioning is ended (YES in Step B11), the positioning processing is ended.

Effect

As described above, in the swimming mode of the second example, a position calculation using a speed obtained as a temporal change of the position obtained from the most recent positioning, instead of the speed obtained from the received frequency, is performed in the prediction step of the Kalman filter, in the position calculation using the Kalman filter in which the pseudo range (code phase) is used and the doppler frequency (received frequency) is not used, among measurement information obtained as a reception result of the GPS satellite signal.

In swimming, a large error may occur in the received frequency (doppler frequency) measured by the positioning device 1 worn on the wrist of the user due to the forward and backward arm swing action of the user. In swimming, although the arm of the user is moved back and forth between below-water-surface (underwater) and above-water-surface (in the air), the GAS satellite signal is remarkably attenuated under the water. For that reason, the positioning operation is performed using only the pseudo range among the received frequency (doppler frequency) and the pseudo range so as to make it possible to improve positioning accuracy.

Third Example

Next, a third example will be described. In the third example, the same constitutional elements as those of the first example and the second example are denoted by the same reference numerals and detailed description thereof will be omitted.

Outline

In the swimming mode of the third example, the positioning operation is performed by using only data of the received signal when the positioning device 1 is present in the air (above water surface) and by not using data of the received signal when the positioning device 1 is present under the water (below water surface)

Configuration

Figure 7:
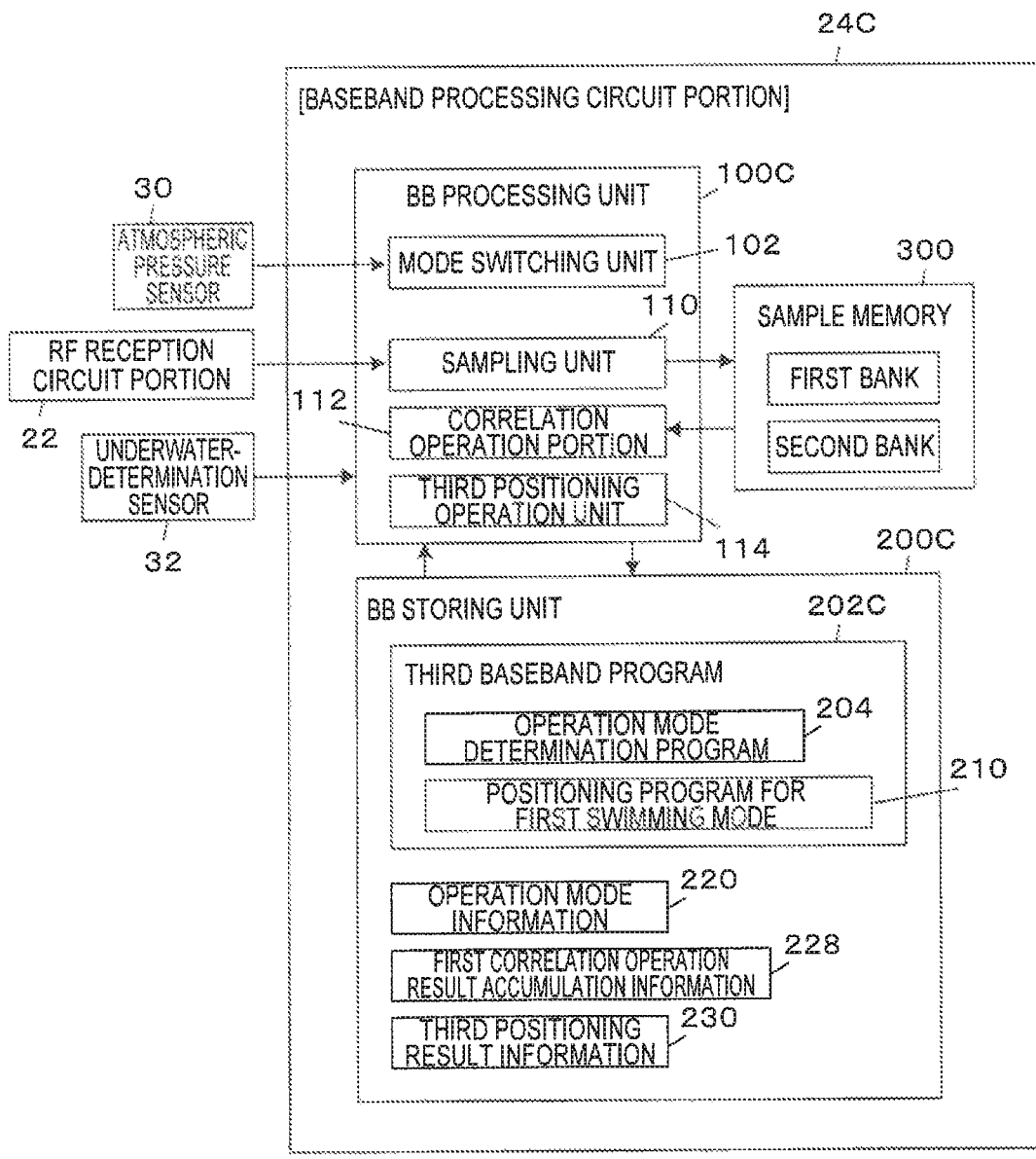
FIG. 7 is a circuit configuration diagram of a baseband processing circuit portion of a third example.

FIG. 7 is a configuration diagram of a baseband processing circuit portion 24C of a third example. According to FIG. 7, the baseband processing circuit portion 24C includes a BB processing unit 1000, a sample memory 300, and a BB storing unit 200C.

The sample memory 300 includes two banks each of which is able to store data of the received signal as much as 20 milliseconds.

The BB processing unit 100C includes the mode switching unit 102, a sampling unit 110, a correlation operation portion 112, and a third positioning operation unit 114.

The sampling unit 110 samples data of the received signal output from the RF reception circuit portion 22 at predetermined sampling intervals and alternately stores sampled data in two banks of the sample memory 300 by using 20 milliseconds as a unit (write).

The correlation operation portion 112 reads data from a bank, which is not a write target of the sampling unit 110, of the sample memory 300 and performs a correlation operation of a replica code and read data of the received signal as much as 20 milliseconds. A doppler frequency and a code phase obtained by the correlation operation, as a single correlation operation result, are accumulated and stored as first correlation operation result accumulation information 228.

The third positioning operation unit. 114 performs the positioning operation based on a correlation operation result by the correlation operation portion 112. Specifically, when it is determined by the underwater-determination sensor 32 that the positioning device is present under the water, the correlation operation portion 112 is not allowed to perform the correlation operation on received data. The positioning operation is performed using only the result of the correlation operation performed on data received in a period of time during which the positioning device 1 is not present under the water. The positioning operation is performed using average values of the doppler frequency and the code phase obtained by performing averaging processing on the correlation operation results each time when a predetermined number or more correlation operation results (for example, 50 results) are accumulated as the first correlation operation result accumulation information 228. The result of the positioning operation is stored as third positioning result information 230.

A third baseband program 202C, the positioning mode information 220, the first correlation operation result accumulation information 228, and the third positioning result information 230 are stored in a BB storing unit 200C. The third baseband program 202C includes the positioning mode determination program 204 for realizing positioning mode determination processing (see FIG. 3) described above and a positioning program 210 for the first swimming mode for realizing positioning processing for a swimming mode (see FIG. 8) which will be described later.

Flow of Processing

Figure 8:
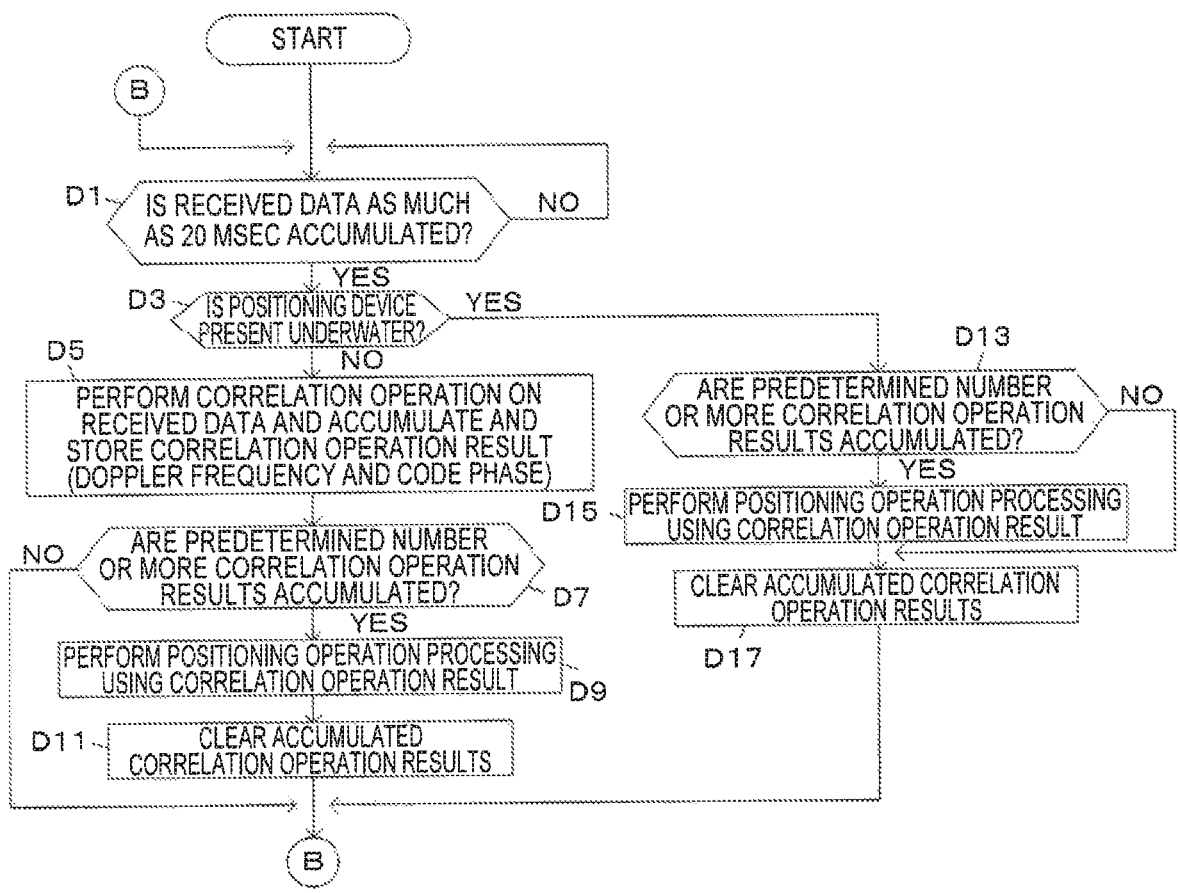
FIG. 8 is a flowchart of positioning processing for a swimming mode in the third example.

FIG. 8 is a flowchart for explaining a flow of positioning processing for a swimming mode which is realized by executing the positioning program 210 for the first swimming mode. The positioning processing is executed in a case where the positioning mode is the swimming mode. In the positioning processing for the swimming mode, first, when data of the received signal as much as 20 milliseconds is not accumulated in a single bank of the sample memory 300 (NO in Step D1), it is waited until data of the received signal as much as 20 milliseconds is accumulated. When data of the received signal as much as 20 milliseconds is accumulated (YES in Step D1), it is determined by the underwater-determination sensor 32 whether the positioning device 1 is determined as one being present under the water.

When the positioning device not present under the water (NO in Step D3), the correlation operation portion 112 performs the correlation operation on data of the received signal as much as 20 milliseconds read from the sample memory 300 and accumulates and stores the correlation operation result (doppler frequency and code phase) (Step D5). Next, when the number of accumulated and stored correlation operation results reaches a predetermined number (for example, 50) (YES in Step D7), the third positioning operation unit 114 performs the positioning operation using the accumulated and stored correlation operation results (Step D9). Also, the accumulated and stored correlation operation results are cleared (Step D11). When the number of accumulated and stored correlation operation results does not reach a predetermined number (NO in Step D7), the positioning operation processing and clearing of the accumulated correlation operation results are not performed.

On the other hand, when the positioning device 1 is present under the water (YES in Step D3), the third positioning operation unit 114 does not perform the correlation operation on the correlation operation portion 112 and determines whether the number of accumulated and stored correlation operation results reaches a predetermined number (for example, 25), and when the number of accumulated and stored correlation operation results reaches a predetermined number (YES in Step D13) the positioning operation using the correlation operation results is performed (Step D15). When the number of accumulated and stored correlation operation results does not reach a predetermined number (NO in Step D13), the positioning operation processing is not performed. Also, the accumulated and stored correlation operation results are cleared (Step D17). After the processing described above is performed, the processing returns to Step D1 and similar processing is repeated.

Effect

According to the swimming mode of the third example, the positioning operation is performed using only the result of the correlation operation performed on data of the received signal when the positioning device 1 is not present under the water, without performing the correlation operation on data of the received signal when the positioning device 1 is present under the water. With this, the positioning operation is performed using only the received signal of which a signal strength is stronger compared to a case where the positioning device 1 is present under the water and which is received when the positioning device 1 is present in the air, without using the received signal of which the signal strength is remarkably attenuated and which is received when the positioning device 1 is present under the water, and thus, it is possible to improve positioning accuracy.

Fourth Example

Next, a fourth example will be described. In the fourth example, the same constitutional elements as those of the first example to the third example are denoted by the same reference numerals and detailed description thereof will be omitted.

Outline

In the swimming mode of the fourth example, a reception operation of a GPS satellite signal by the RF reception circuit portion 22 which is a reception unit is temporarily stopped when the positioning device 1 is present under the water (below water surface), and the positioning operation is performed using only data of the received signal when the positioning device 1 is present in the air (above water surface).

Configuration

Figure 9:
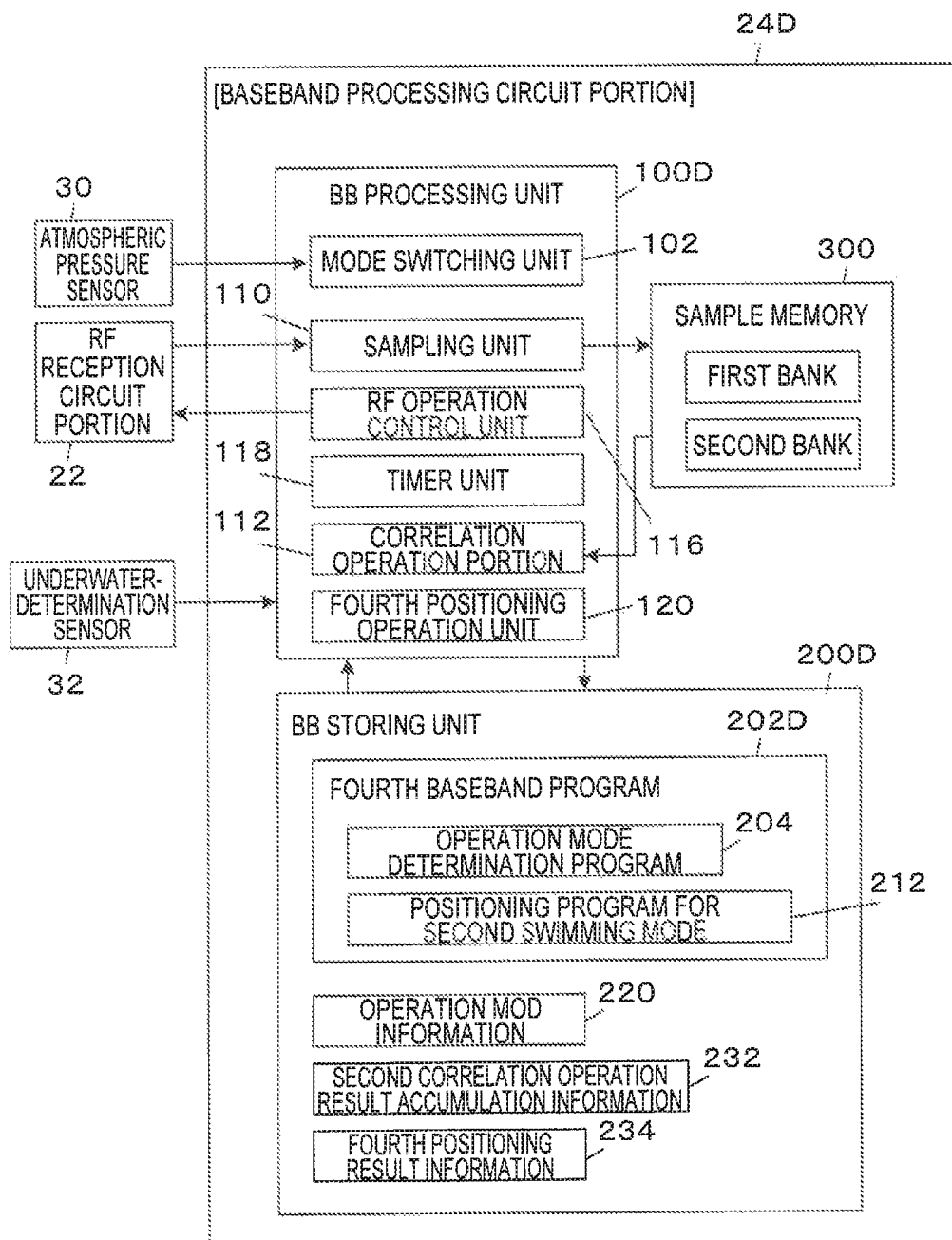
FIG. 9 is a circuit configuration diagram of a baseband processing circuit portion in a fourth example.

FIG. 9 is a configuration diagram of a baseband processing circuit portion 241D in the fourth example. According to FIG. 9, in the baseband processing circuit portion 24D, a BB processing unit 100D includes the mode switching unit 102, an RF operation control unit 116, a timer unit 118, the correlation operation portion 112, and a fourth positioning operation unit 120.

The RF operation control unit 116 controls an operation of the RF reception circuit portion 22. Specifically, when determined, by the underwater-determination sensor 32, that the positioning device is present under the water, the RF operation control unit 116 stops a reception operation of the RF reception circuit portion 22 and causes the sampling unit 110 to stop sampling of data of the received signal. After the reception operation is stopped, it is determined, by the underwater-determination sensor 32, whether the positioning device is present under the water, each time when an elapsed time measured by the timer unit 118 reaches 20 milliseconds which becomes a unit of a single correlation operation. When it is determined that the positioning device is not present under the water, the reception operation of the RF operation control unit 116 is started and the sampling unit 110 is caused to start sampling of data of the received signal.

The timer unit 118 measures an elapsed time according to an instruction of the RF operation control unit 116.

The fourth positioning operation unit 120 performs the positioning operation based on the result of the correlation operation by the correlation operation portion 112. Specifically, the reception operation of the RF reception circuit portion 22 and the sampling operation of the sampling unit 110 are stopped by the RF operation control unit 116 in a period of time during which the positioning device 1 present under the water and thus, the positioning operation is performed using only the result of the correlation operation performed on data received in a period of time during which the positioning device 1 is not present under the water. The positioning operation is performed using average values of the doppler frequency and the code phase obtained by performing averaging processing on the correlation operation results each time when a predetermined number or more correlation operation results (for example, 50 results) are accumulated as second correlation operation result accumulation information 232. The result of the positioning operation is stored as fourth positioning result information 234.

A fourth baseband program 202D, the positioning mode information 220, the second correlation operation result accumulation information 232, and the fourth positioning result information 234 are stored in a BB storing unit 200D. The fourth baseband program 202D includes the positioning mode determination program 204 for realizing positioning mode determination processing (see FIG. 3) described above and a positioning program for the second swimming mode 212 for realizing positioning processing for a swimming mode (see FIG. 13) which will be described later.

Flow of Processing

Figure 10:
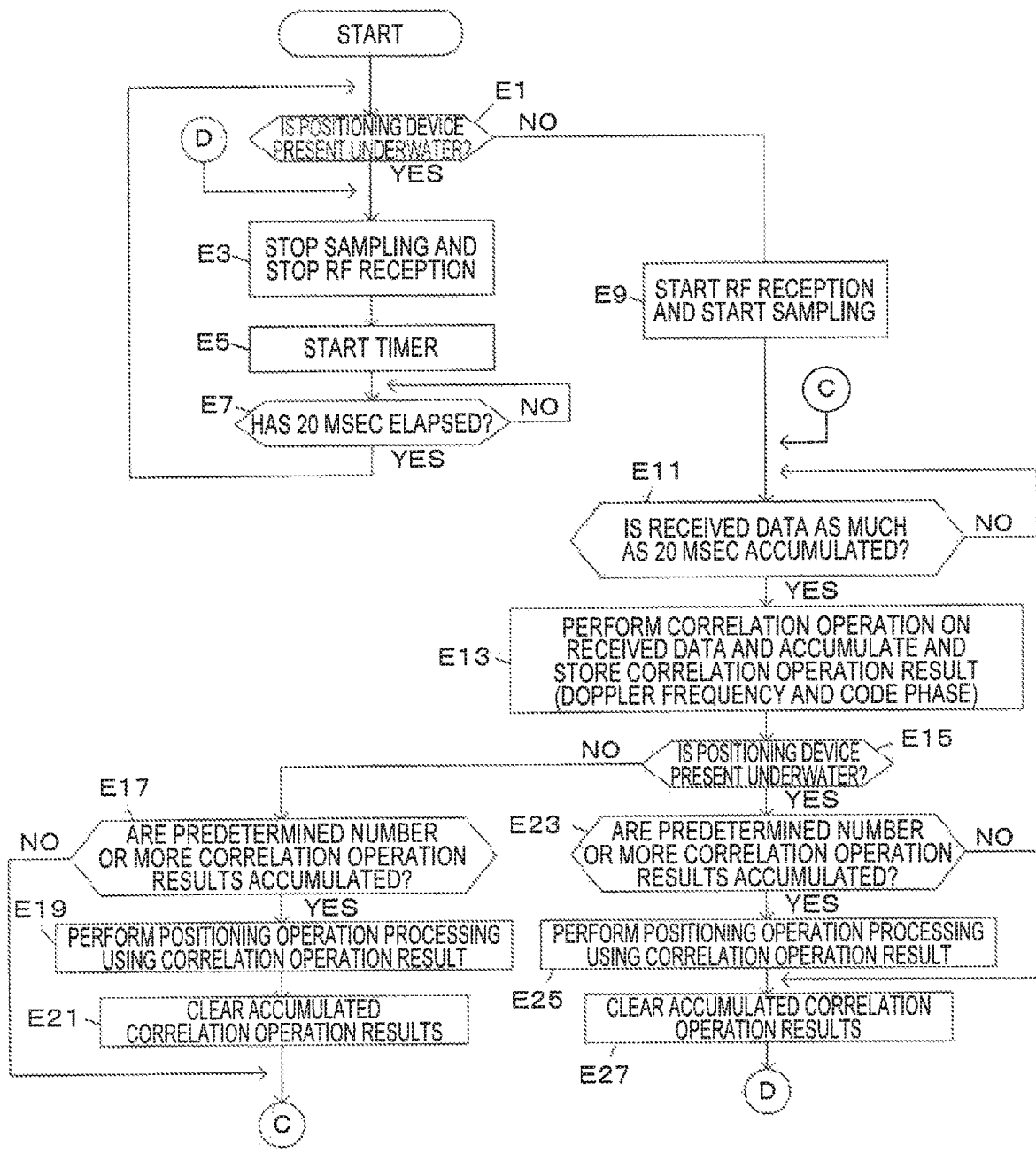
FIG. 10 is a flowchart of positioning processing for a swimming mode in the fourth example.

FIG. 10 is a flowchart for explaining a flow of positioning processing for a swimming mode realized by executing the positioning program for the second swimming mode 212 in the fourth example. The positioning processing is executed in a case where the positioning mode is the swimming mode. In the positioning processing for the swimming mode, first, it is determined, by the underwater-determination sensor 32, whether the positioning device 1 is present under the water. When the positioning device 1 is present under the water (YES in Step E1), the RF operation control unit 116 causes the sampling unit 110 to stop sampling of received signal and stops a reception operation of the RE reception circuit portion 22 (Step E3). Next, the RF operation control unit 116 causes the timer unit 118 to start measuring of time (Step E5). When the measured time of the timer unit 118 reaches 20 milliseconds (YES in Step E7), the processing returns to Step E1 and it is determined again whether the positioning device 1 is present under the water.

When the positioning device 1 is not present under the water (NO in Step E1), the RF operation control unit 116 causes the reception operation of the RF reception circuit portion 22 to be started and causes the sampling unit 110 to start sampling of the received signal (Step E9). When data of the received signal as much as 20 milliseconds is not accumulated in a single bank of the sample memory 300 (NO in Step E11), it is waited until data of the received signal as much as 20 milliseconds is accumulated. When data of the received signal as much as 20 milliseconds is accumulated (YES in Step E11), the correlation operation portion 112 performs the correlation operation on data of the received signal as much as 20 milliseconds read from the sample memory 300 and accumulates and stores the correlation operation result (doppler frequency and code phase) (Step E13).

Next, it is determined, by the underwater-determination sensor 32, whether the positioning device 1 is present under the water. When the positioning device 1 is not present under the water (NO in Step E15), it is determined whether the number of the accumulated and stored correlation operation result reaches a predetermined number (for example, 50). When the number of the accumulated and stored correlation operation result reaches a predetermined number (YES in Step E17), the fourth positioning operation unit 120 performs the positioning operation using the accumulated and stored correlation operation result (Step E19). Also, the accumulated and stored correlation operation result is cleared (Step E21). When the number of the accumulated and stored correlation operation result does not reach a predetermined number (NO in Step E17), the correlation operation processing and clearing of the accumulated correlation operation result are not performed. When processing described above is performed, the positioning processing returns to Step E11 and similar processing is repeated.

On the other hand, when the positioning device 1 is present under the water (YES in Step E15), it is determined whether the number of the accumulated and stored correlation operation result reaches a predetermined number (for example, 25). When the number of the accumulated and stored correlation operation result reaches the predetermined number (YES in Step E23), the positioning operation using the correlation operation results is performed (Step E25). When the number of the accumulated and stored correlation operation result does not reach the predetermined number (NO in Step E23), the positioning operation processing is not performed. Also, the accumulated and stored correlation operation result is cleared (Step E27). When processing described above is performed, the positioning processing returns to Step E3 and similar processing is repeated.

Effect

As such, according to the swimming mode of the fourth example, when the positioning device 1 is present under the water, a reception operation of a satellite signal is not performed and the positioning operation is performed using only the result of the correlation operation performed on data of the received signal when the positioning device is not present under the water. With this, the positioning operation is performed using only the received signal of which a signal strength is stronger compared to a case where the positioning device 1 is present under the water and which is received when the positioning device 1 is present in the air, without using the received signal of which the signal strength is remarkably attenuated and which is received when the positioning device 1 is present under the water, and thus, it is possible to improve positioning accuracy. Furthermore, the reception operation of the RF reception circuit portion 22 is stopped when the positioning device 1 is present under the water and thus, it is possible to reduce power consumption.

Modification Example

Embodiments to which the present is applicable are not limited to the embodiments described above and of course, are able to be suitably modified in a range without departing from a gist of the invention.

(A) Switching of Positioning Mode

In the embodiments described above, although the positioning mode is automatically switched based on a measurement value of the atmospheric pressure sensor 30, the positioning mode may be switched according to a manipulation instruction by a user through the operation unit 42.

(B) KF Positioning Processing

In the fourth example, an operation may be performed by regarding that the position is not moved, that is, the speed is zero, in the prediction step of the positioning operation using a Kalman filter. This is because an interval of the positioning operation is approximately 1 second and in a case of swimming, a movement distance in 1 second is short and the distance is able to be corrected in a correction step performed immediately after.

(C) Satellite Positioning System

In the embodiments described above, although the GPS is explained by way of an example of the satellite positioning system, a satellite positioning system such as a global navigation satellite system (GLONASS), Galileo, Beidou, or the like may be adopted.

(D) Exemplified Numerical Values

Numerical values exemplified in the embodiments described above are just an example and other numerical values may also be used. In the third example and the fourth example, although the sample memory 300 having two banks is described, the sample memory 300 may have three or more banks.

The entire disclosure of Japanese Patent Application No. 2016-081210, filed Apr. 14, 2016 is expressly incorporated by reference herein.

What is claimed is:

1. A positioning control method of a positioning device worn on a user's body, the method comprising:
   receiving positioning satellite signals from positioning satellites by a receiver;
   acquiring measurements including a code phase and a doppler frequency derived from the positioning satellite signals by a processor;
   determining whether a current mode is a swimming mode or not by the processor using a sensor; and
   calculating a position of the positioning device using the code phase when the current mode is the swimming mode, and calculating the position of the positioning device using the code phase and the doppler frequency when the current mode is not the swimming mode.

2. The positioning control method according to claim 1, wherein the position of the positioning device is calculated by a least square method when the current mode is the swimming mode.

3. The positioning control method according to claim 1, wherein the position of the positioning device is calculated by Kalman filter processing when the current mode is not the swimming mode.

4. A positioning device worn on a user's body, the positioning device comprising:
   a receiver configured to receive positioning satellite signals from positioning satellites;
   an atmospheric pressure sensor configured to measure an atmospheric pressure;
   a processor configured to
      acquire measurements including a code phase and a doppler frequency derived from the positioning satellite signals,
      determine whether a current mode is a swimming mode or not using the atmospheric pressure sensor, and
      calculate a position of the positioning device using the code phase when the current mode is the swimming mode, and calculate the position of the positioning device using the code phase and the doppler frequency when the current mode is not the swimming mode.

5. The positioning device according to claim 4, wherein the processor calculates the position of the positioning device by a least square method when the current mode is the swimming mode.

6. The positioning device according to claim 4, wherein the processor calculates the position of the positioning device by Kalman filter processing when the current mode is not the swimming mode.

7. The positioning control method according to claim 2, wherein the position of the positioning device is calculated by Kalmna filter processing when the current mode is not the swimming mode.

8. The positioning control method according to claim 1, wherein the sensor is an atmospheric pressure sensor.

9. The positioning control method according to claim 8, wherein the current mode is determined as the swimming mode when a change of a measurement value of the atmospheric pressure sensor in a predetermined period of time exceeds a predetermined threshold.

10. The positioning control method according to claim 1, wherein whether the current mode is the swimming mode or not is determined by comparing a change of a measurement data of the sensor and a predetermined threshold.

11. The positioning device according to claim 5, wherein the processor calculates the position of the positioning device by Kalman filter processing when the current mode is not the swimming mode.

12. The positioning control method according to claim 4, wherein the processor determines the current mode is the swimming mode when a change of a measurement value of the atmospheric pressure in a predetermined period of time exceeds a predetermined threshold.

* * * * *